MIRROR POSITIONER FOR A ROTATING MIRROR CAMERA

Filed Nov. 14, 1968

INVENTOR.
Benjamin T. Rogers

United States Patent Office 3,527,110
Patented Sept. 8, 1970

3,527,110
MIRROR POSITIONER FOR A ROTATING
MIRROR CAMERA
Benjamin T. Rogers, Embudo, N. Mex., assignor to the United States of America as represented by the United States Atomic Energy Commission
Filed Nov. 14, 1968, Ser. No. 775,742
Int. Cl. F16h 25/12
U.S. Cl. 74—89.15                    2 Claims

ABSTRACT OF THE DISCLOSURE

A device for positioning the mirror of a rotating mirror camera so that the mirror will accurately fold the primary optical axis of the camera so as to be coincident with the optical axis of the focusing microscope. A shaft in the device is placed in engagement with the rotating mirror's shaft and held in engagement by a multiple lead actuating nut. Movement of a tangent arm that extends from the shaft in the device causes rotation of both shafts. Fine adjustment is accomplished by a tangent screw and spring loaded plunger operating in opposition thereto, said tangent screw and plunger located normal to the tangent arm.

---

The invention described herein was made in the course of, or under, a contract with the U.S. Atomic Energy Commission.

This invention relates to a device that enables precise alignment of the mirror of a rotating mirror camera.

Rotating mirror cameras require a high degree of precision in the alignment procedures. A need exists for a simple and inexpensive device that may be made a part of the rotating mirror drive that provides for both coarse and fine adjustment in locating the rotating mirror in a given angular position. Applicant's invention satisfies these requirements with a minimum of structure and therefore is easy to build, operate, and maintain.

In a rotating mirror smear camera the object of interest is focused on the slit plane of the camera by means of an objective lens. The image of the slit is focused by a transfer lens system on the film plane. The rotating mirror interposed between the transfer lens system and the film plane folds that portion of the camera optic axis. As the mirror rotates, the image of the slit traverses the film plane providing a time-space record of the event focused on the slit at the slit plane. When the camera is being accurately focused, the optical axis of the camera must be made coincident with the optical axis of the focusing microscope, said microscope being focused at the film emulsion plane. This alignment is easily accomplished by the applicant's device and not disclosed by prior art.

Figure 1:
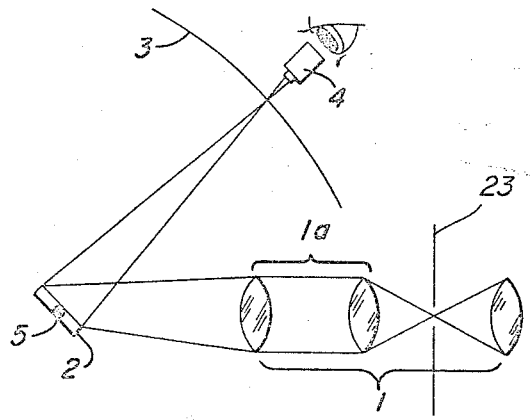
FIG. 1 is a diagram showing the alignment of a rotating mirror camera.

Alignment of the lens system mirror and film strip is shown in FIG. 1. The image of an object that has been focused at the slit plane 23 is reflected off of mirror 2 and refocused at the film plane 3 by transfer lens means 1a. In order to insure focusing, a microscope 4 is placed on the far side of film strip 3 and viewed by eye. The mirror shaft (the axis of the mirror shaft is shown coming out of FIG. 1 through point 5) must be rotated to provide alignment and a problem has existed in providing fine adjustment in such rotation.

Figure 2:
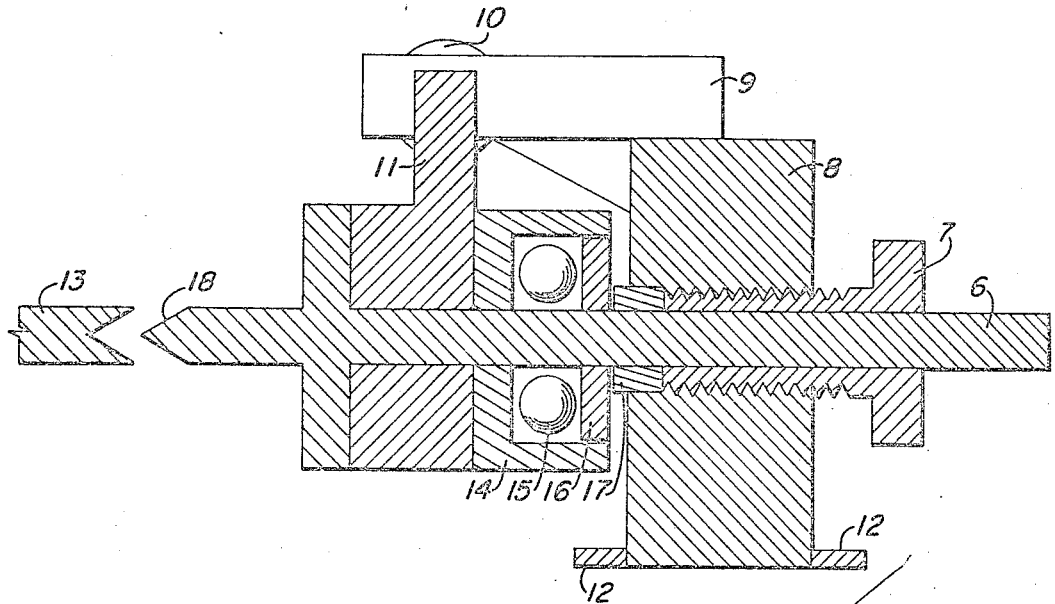
FIG. 2 is a sectional side view of applicant's device on line with the rotating mirror shaft.

FIG. 2 shows applicant's device which provides fine adjustment in rotating the mirror's shaft. The base 8 may be positioned and securely attached by feet 12 so that surface 18 of the positioner shaft 6 is in abutment with the mirror's shaft 13. The adjustment nut 7 is then tightened so that force is applied through the thrust bushing and bearing assembly 17, 16, 15, 14 and surface 18 becomes pressed against shaft 13. Movement of tangent arm 11 causes rotation of the shaft 6 which is transmitted to shaft 13.

Pressure is applied at surface 18 by means of a thrust bearing 16. Shaft 6 is free to rotate while the force applied by tightening nut 7 is transmitted through thrust bushing 17, thrust bearing 16, ball bearing 15, and bearing retainer 14 to shaft 13.

Other means of securing shaft 6 to shaft 13 could be utilized. For example, mating grooves on the two shafts could be engaged to provide simultaneous rotation of the shafts.

Figure 3:
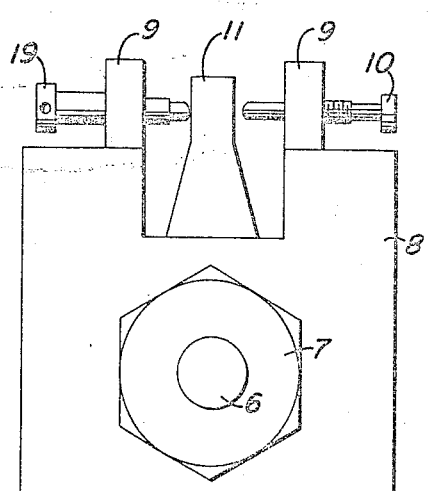
FIG. 3 is an end view of applicant's device.

FIG. 3 is an end view of the device showing the spring loaded plunger 19 and tangent screw 10 in position to provide fine adjustment in the rotation of the shafts. Tangent screw 10 is located normal to the tangent arm 11 and held in place by support 9. Spring loaded plunger 19 is located normal to tangent arm 11 directly opposite from the tangent screw 10. Adjustment of the tangent screw 10 moves the tangent arm 11 and the force of the spring in plunger 19 maintains the tangent arm in position with the tangent screw 10.

Figure 4:
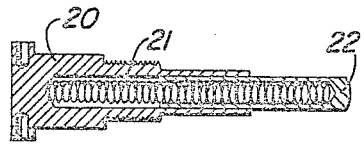
FIG. 4 is a sectional view of the spring loaded plunger element.

FIG. 4 shows the details of plunger 19. It consists of a plunger housing 20, a spring 21 and plunger 22.

The application of a device incorporating applicant's invention to a rotating mirror fast-framing camera will be obvious to those skilled in the art.

What I claim is:
1. A device for rotatably aligning the mirror of a rotating mirror camera comprising:
 a base (8) for mounting said device,
 a shaft (6) for abutment with the shaft (13) of the rotating mirror,
 an adjustment nut (7) around said shaft (6) and rotatably mounted in said base (8),
 a thrust bushing and bearing assembly (17, 16, 15 and 14), a first portion (14) of which is fixedly mounted to said shaft (6), and a second portion (17) of which is rotatably mounted to said shaft (16) and abuts said nut (7) such that the rotation of said nut (7) in said base (8) will move said shaft into frictional engagement with said mirror shaft (13),
 a tangent arm (11) fixedly mounted to said shaft (6) and extending therefrom,
 a tangent screw (10) substantially normal to the longitudinal axis of said arm (11) and abutting one side of said arm (11), said screw being rotatably mounted in a support (9) such that the rotation of said screw (10) in said support (9) will impart rotational motion to said shaft (6) to provide fine adjustment in the rotation of said mirror shaft (13) when said shafts (6 and 13) are in frictional engagement.
2. A rotating mirror alignment device as in claim 1 including a spring-loaded plunger (19) mounted in said support (9) substantially normal to the longitudinal axis of said arm (11) and abutting the opposite side of said arm (11), the spring force of said plunger (19) maintaining the tangent arm (11) in abutting contact with said tangent screw (10).

References Cited
UNITED STATES PATENTS
2,338,271   1/1944   Ulanet _____ 74—89.15

WESLEY S. RATLIFF, Jr., Primary Examiner